No. 848,244. PATENTED MAR. 26, 1907.
W. H. HORSTMANN.
VARIABLE SPEED GEAR AND REVERSING MECHANISM.
APPLICATION FILED JUNE 27, 1906.
2 SHEETS—SHEET 1.
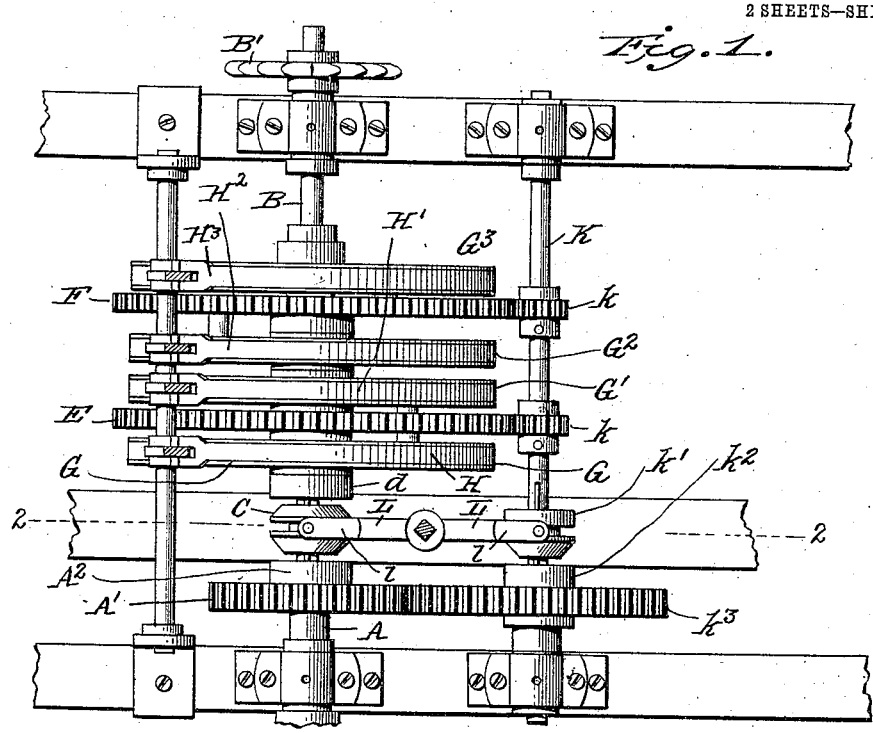
Witnesses
Edwin L. Jewell
J H Gallaher
Inventor
William H. Horstmann
By
J. F. Beale
Attorney No. 848,244. PATENTED MAR. 26, 1907.
W. H. HORSTMANN.
VARIABLE SPEED GEAR AND REVERSING MECHANISM.
APPLICATION FILED JUNE 27, 1906.

2 SHEETS—SHEET 2.

Witnesses
Edwin L. Jewell
J H Gallaher

Inventor
William H Horstmann
By
J. F. Beale
Attorney

UNITED STATES PATENT OFFICE.

WILLIAM H. HORSTMANN, OF PHILADELPHIA, PENNSYLVANIA.

VARIABLE-SPEED GEAR AND REVERSING MECHANISM.

No. 848,244.                Specification of Letters Patent.        Patented March 26, 1907.

Application filed June 27, 1906. Serial No. 323,589.

*To all whom it may concern:*

Be it known that I, WILLIAM H. HORSTMANN, a citizen of the United States, residing at Philadelphia, in the county of Philadelphia and State of Pennsylvania, have invented certain new and useful Improvements in Variable-Speed Gear and Reversing Mechanism, of which the following is a specification.

My invention relates to improvements in a combined variable-speed gear and reversing mechanism.

The object of my invention is to provide an improved form of change-gear and reversing mechanism which will furnish the required number of forward speeds with a minimum amount of friction.

It is also my object to simplify and improve the construction where a counter-shaft is employed and provision made for a direct drive between the engine-shaft and driven shaft.

In the accompanying drawings, forming a part of this specification, I have shown my invention adapted to a motor-vehicle, in which—

Figure 3:
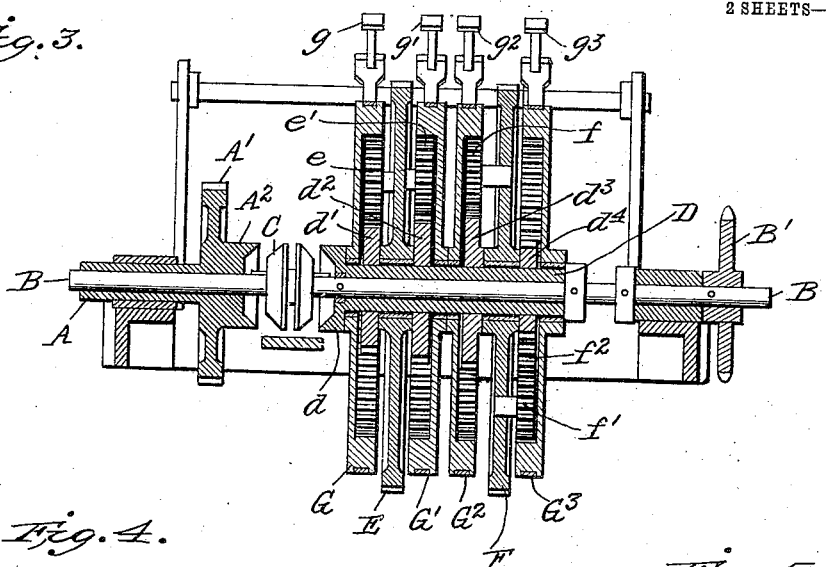
Figure 4:
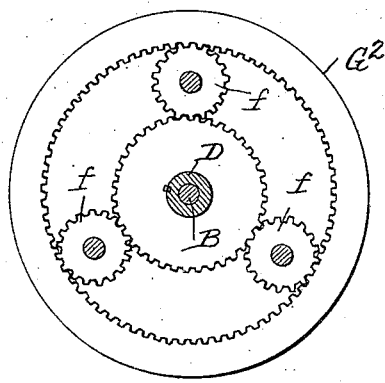
Figure 5:
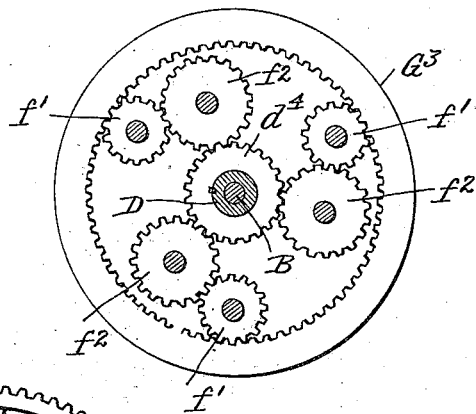
Figure 6:
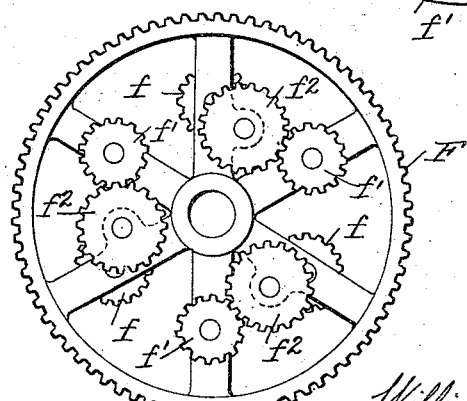

Figure 1 is a plan view showing an underframe of a vehicle with my invention applied. Fig. 2 is a longitudinal section taken on the line 2 2 of Fig. 1. Fig. 3 is a vertical cross-section taken on the axial line of the driven shaft. Fig. 4 is a view looking to the inside of the forward-speed brake-drums. Fig. 5 is a view looking to the inside of the reverse brake-drum. Fig. 6 is a side elevation of one of the large driving gear-wheels detached carrying orbital pinions on each side.

Referring more particularly to the drawings, A denotes the driving-shaft, and A' a spur-wheel keyed to said shaft, having a female clutch $A^2$ fast thereto or formed integral with the hub.

B denotes the driven shaft, one end of which turns freely in the recessed end of the driving-shaft. The opposite end of shaft B carries the usual sprocket-wheel B'.

C denotes a double-faced male clutch, which registers with clutch $A^2$ and is splined to shaft B, on which it slides.

D denotes a sleeve loosely mounted on shaft B, provided with a female clutch $d$, which registers with clutch C. $d'$ $d^2$ $d^3$ $d^4$ denote spur-gears fast to said sleeve.

E and F denote two large gear-wheels loosely mounted on sleeve D, the former placed between spurs $d'$ and $d^2$ and the latter between spurs $d^3$ and $d^4$. The wheel E is provided on one side with stud-axles carrying orbital pinions $e$, which mesh with spur $d'$. On its opposite side wheel E is provided with stud-axles which carry orbital pinions $e'$, which mesh with spur $d^2$. The wheel F is provided on one side with stud-axles carrying orbital pinions $f$, while on its opposite side it is provided with a series of stud-axles carrying trains of orbital pinions composed of pinions $f'$ $f^2$.

G G' $G^2$ $G^3$ denote four internally-geared drums loosely mounted on sleeve D, the drums G G' being placed on opposite sides of gear-wheel E and the drums $G^2$ $G^3$ on opposite sides of wheel F. The drum G meshes with pinion $e$, and the drum G' meshes with pinion $e'$. The drum $G^2$ meshes with pinion $f$, and the drum $G^3$ meshes with pinion $f'$.

H H' $H^2$ $H^3$ denote four constriction band-brakes for said drums, operated by foot-levers $g$ $g'$ $g^2$ $g^3$.

K denotes a counter-shaft, having keyed thereto spur-gears $k$ $k$ and a male clutch $k'$ splined thereto and adapted to slide lengthwise thereof.

$k^2$ denotes a clutch registering with clutch $k'$ and forms part of or is made fast to a pinion $k^3$. This pinion is loosely mounted on the counter-shaft and meshes with pinion A' on the driving-shaft.

L denotes a double-acting shift-arm which simultaneously operates C and $k'$. Said arm is pivoted midway of its length to the underframe at a point equidistant from the driven shaft and counter-shaft. It is provided at each end with spanners $l$ $l$, which ride in annular grooves in said clutches.

M denotes a post rigidly fastened at its lower end to the shift-arm, directly over the pivotal point thereof, and $m$ denotes a hand-wheel for operating said post. This post may be placed in juxtaposition to or inclosed with a steering-pillow (not shown) to meet the convenience of the driver or operator.

It will be seen that my invention provides for a direct drive from the engine or driving-shaft to the driven shaft without the intervention of gearing or bringing into play the counter-shaft, thus avoiding friction and consequent loss of power when running at engine speed. To obtain this direct drive, the clutch C on the driven shaft is thrown to the left and engages clutch $A^2$, thus connecting the driving and driven shafts and simultaneously releasing the counter-shaft by disengaging clutches $k'$ $k^2$. This arrangement of the clutches C and $A^2$ and clutches $k'$ $k^2$ also provides for running the motor or engine independently of the driven shaft, which is necessary where an explosive-engine is used. To effect this, the clutch C is thrown midway between clutches $A^2$ and $d$, as shown in Fig. 1.

My invention also provides besides the engine speed three forward speeds, thus affording four forward speeds and a reverse. To effect these changes, the counter-shaft is brought into play by throwing clutch $k'$ in engagement with clutch $k^2$. This action simultaneously throws clutch C in engagement with clutch $d$, thereby locking sleeve D to the driven shaft. Spur-gears $k$ $k$ on counter-shaft actuate gear-wheels E F.

The lowest forward speed and the reverse are effected by the gear-wheel F, carrying orbital pinions $f$ on its left side, with spur-wheel $d^3$ and orbital pinions $f'$ $f^2$ on its right side in mesh with spur-gear $d^4$, together with internally-geared drums $G^2$ $G^3$, arranged on opposite sides of wheel E and meshing, respectively, with orbital pinions $f$ and $f'$. The drum $G^3$ gives the reverse, while the drum $G^2$ gives the low forward speed. The two next highest speeds are effected by the gear-wheel E, carrying on its right side orbital pinions $e'$ in mesh with spur-gear $d^2$ and on its left side orbital pinion $e$ in mesh with spur-gear $d'$, together with the internally-geared drums $G'$ and $G$, arranged on opposite sides of wheel E and meshing, respectively, with orbital pinions $e'$ and $e$. A suitable gear-case (not shown) may be provided to inclose the change-speed gear. The relative proportions of the gear-wheels, spur-gears, pinions, and orbital pinions may be varied to suit requirements without departing from the gist of my invention.

Having thus shown and described my invention, what I claim, and desire to secure by Letters Patent, is—

1. In a reversing mechanism, the combination of the driving-shaft, the driven shaft, means for detachably connecting said shafts, a sleeve loosely mounted on the driven shaft, means for detachably connecting said sleeve to the driven shaft, a spur-gear fast to said sleeve, a gear-wheel loosely mounted on said sleeve, means for operating said gear-wheel, a reversing-train of orbital pinions mounted on stud-axles on said gear-wheel and in mesh with said spur-gear, a brake-drum loosely mounted on said sleeve provided with an internal gear meshing with said orbital pinions and a brake for said drum.

2. In a change-speed and reversing mechanism, the combination of the driving-shaft, the driven shaft, means for detachably connecting said shafts, a sleeve loosely mounted on the driven shaft, means for detachably connecting said sleeve to the driven shaft, a plurality of spur-gears fast to said sleeve, a gear-wheel loosely mounted on said sleeve between said spur-gears, means for operating said gear-wheel, a reversing-train of orbital pinions mounted on stud-axles to one side of said gear-wheel and in mesh with one of said spur-gears, a change-speed orbital pinion mounted on a stud-axle on the opposite side of said gear-wheel and in mesh with the spur-gear on that side, brake-drums loosely mounted on said sleeve upon opposite sides of said gear-wheel provided with internal gears in mesh with the orbital pinions upon the corresponding side of said gear-wheel and brakes for said drums.

3. In a change-speed gear, the combination of the driving-shaft, the driven shaft, means for detachably connecting said shafts, a sleeve mounted loosely on the driven shaft, a plurality of spur-gears fixed to said sleeve, gear-wheels mounted loosely upon said sleeve between said spur-gears provided upon each side with stud-axles, orbital pinions mounted upon said stud-axles meshing with said spur-gears, internally-geared brake-drums mounted loosely upon said sleeve on opposite sides of said gear-wheels and meshing with said spur-gears, brakes for said drums, a counter-shaft, spur-gears mounted on said counter-shaft in mesh with said gear-wheels, means for detachably connecting the counter-shaft to the driving-shaft.

4. In a change-speed gear, the combination of the driving-shaft, the driven shaft, the counter-shaft, a spur-wheel keyed to the driving-shaft provided with a clutch member, a pinion loose on the counter-shaft in mesh with said spur-wheel and provided with a clutch member, a sleeve loosely mounted on the driven shaft having a clutch member, a double-faced clutch member splined to the driven shaft, a clutch member splined to the counter-shaft, a pivoted shift-arm adapted to operate said splined clutch members, spur-gears fast to said sleeve, gear-wheels mounted loosely on said sleeve, spur-gears mounted on the counter-shaft in mesh with said gear-wheels, orbital pinions mounted on said gear-wheels and in mesh with the spur-gears on said sleeve, the internally-geared brake-drums mounted loosely on said sleeve meshing with said orbital pinions, and band-brakes for said drums.

5. In a change-speed gear, the combination of the driving-shaft, the driven shaft, the counter-shaft, the sleeve loosely mounted on the driven shaft, spur-gears fast to said sleeve, the gear-wheels loosely mounted on said sleeve, orbital pinions mounted on opposite sides of said gear-wheels meshing with said spur-gears, internally-geared brake-drums loosely mounted on said sleeve meshing with said orbital pinions, brakes for said drums, spur-gears on the counter-shaft meshing with said gear-wheels, means for detachably connecting said sleeve to the driven shaft, means for detachably connecting the driving and driven shafts, means for detachably connecting the driving and counter shafts.

6. In a change-speed gear, the combination with the driving-shaft, driven shaft, counter-shaft, power-transmitting sleeve loosely mounted on the driven shaft provided with a clutch member, of the clutch member on the driving-shaft, the double-faced sliding clutch on the driven shaft adapted to engage said clutches, the pinion loosely mounted on the counter-shaft having a clutch member, the sliding clutch member splined to the counter-shaft registering with said pinion's clutch member, and the pivoted shift-arm adapted to actuate said clutch members.

In testimony whereof I have signed my name to this specification in the presence of two subscribing witnesses.

WILLIAM H. HORSTMANN.

Witnesses:
ANNETTA SMITH,
GEO. L. CRAWFORD.